(12) United States Patent
Kang et al.

(10) Patent No.: US 7,714,695 B2
(45) Date of Patent: May 11, 2010

(54) METHOD FOR MANUFACTURING SRTIO$_3$ SERIES VARISTOR USING GRAIN BOUNDARY SEGREGATION

(75) Inventors: Suk-Joong Kang, Daejeon (KR);
Seong-Min Wang, Seoul (KR);
Sung-Yoon Chung, Incheon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 650 days.

(21) Appl. No.: 11/709,291

(22) Filed: Feb. 22, 2007

(65) Prior Publication Data
US 2007/0273468 A1    Nov. 29, 2007

(30) Foreign Application Priority Data
Mar. 30, 2006    (KR)    ............ 10-2006-0028983

(51) Int. Cl.
*H01C 7/10*    (2006.01)
(52) U.S. Cl. .................. 338/20; 29/610.1; 29/611; 338/333; 338/224
(58) Field of Classification Search .......... 338/20, 338/21, 22 R, 223–224, 333; 29/610.1, 611–612, 29/619, 851; 361/321
See application file for complete search history.

(56) References Cited

U.S. PATENT DOCUMENTS 4,551,269 A * 11/1985 Hennings et al. ....... 252/519.12
4,606,116 A * 8/1986 Hennings et al. .......... 29/610.1
4,612,160 A    9/1986 Donlevy et al.
5,414,403 A * 5/1995 Greuter et al. ............ 338/22 R
6,147,587 A * 11/2000 Hadano et al. ................ 338/21
6,611,192 B1 * 8/2003 Kamoshida et al. .......... 338/20

FOREIGN PATENT DOCUMENTS

KR    10-1999-0002445    8/2000
KR    10-1999-0057370    7/2001

OTHER PUBLICATIONS

English language abstract of Korean Patent Application No. 10-1999-0002445 Korean Patent Abstracts (listed on accompanying PTO/SB/08A as document FP1).
English-Language Abstract of Korean Patent Application No. 10-1999-0057370 Korean Patent Abstracts (listed (listed on accompanying PTO/SB/08A as document FP2).
Chung, S. et al., "Effects of donor concentration and oxygen partial pressure on interface morphology and grain growth behavior in SrTiO$_3$," *Acta Mater.* 50:3361 (2002) Elsevier Science Ltd.

(Continued)

*Primary Examiner*—Kyung Lee
(74) *Attorney, Agent, or Firm*—Sterne, Kessler, Goldstein & Fox P.L.L.C.

(57) ABSTRACT

The present invention relates to a method for manufacturing a SrTiO$_3$ series varistor using grain boundary segregation, and more particularly, to a method for manufacturing a SrTiO$_3$ series varistor by sintering a powdered composition in which acceptors such as Al and Fe are added in powdered form and then sintered under a reducing atmosphere and heat-treated them in the air to selectively form electrical conduction barriers at grain boundaries in a process for manufacturing SrTiO$_3$ series varistor having an excellent non-linear coefficient and a breakdown voltage suitable for use.

13 Claims, 4 Drawing Sheets

OTHER PUBLICATIONS

Chung, S. et al., "Effect of Sintering Atmosphere on Grain Boundary Segregation and Grain Growth in Niobium-Doped Sr TiO$_3$," *J. Am. Ceram. Soc. 85*:2805 (2002) The American Ceramic Society.

Clarke, D., "Varistor Ceramics," *J. Am. Ceram. Soc. 82*:485 (1999) The American Ceramic Society.

Gupta, T. K., "Application of Zinc Oxide Varistors," *J. Am. Ceram. Soc. 73*:1817 (1990) The American Ceramic Society.

Jeon, J. and Kang, S., "Effect of Sintering Atmosphere on Interface Migration of Niobium-Doped Strontium Titanate during Infiltration of Oxide Melts," *J. Am. Ceram. Soc. 77*:1688 (1994) The American Ceramic Society.

Kutty, T.R.N. and Philip, S., "Low voltage varistors based on SrTiO$_3$ ceramics," *Mater. Sci. Eng. B33*:58 (1995) Elsevier Science S.A.

Kuwabara, M. and Matsuda, H., "Varistor characteristics in PTCR-type (Ba,Sr) TiO$_3$ ceramics prepared by single-step firing in air," *J. Mater. Sci. 34*:2635 (1999) Kluwer Academic Publishers.

\* cited by examiner

METHOD FOR MANUFACTURING SRTIO$_3$ SERIES VARISTOR USING GRAIN BOUNDARY SEGREGATION

CROSS-REFERENCE TO RELATED APPLICATIONS

This application claims priority to Korean Patent Application No. 10-2006-0028983, filed Mar. 30, 2006, which is incorporated by reference herein in its entirety.

BACKGROUND OF THE INVENTION

1. Field of the Invention

The present invention relates to methods for manufacturing a SrTiO$_3$ series varistor, the method comprising sintering in a reducing atmosphere a SrTiO$_3$ composition having at least one of a donor impurity such as Niobium and an acceptor impurity such as aluminum or iron, and selectively oxidizing grain boundaries present in the composition.

2. Background of the Invention

Strontium Titanium Oxide (SrTiO$_3$) series variable resistors ("varistors") have higher dielectric constants than previously examined Zinc oxide (ZnO) varistors, and also exhibiting low loss coefficients. It has been shown that SrTiO$_3$ varistors exhibit usable non-linear current-voltage characteristics when the interior grain of the SrTiO$_3$ compositions are conductive and grain boundaries within the SrTiO$_3$ compositions display an electrical conduction barrier (Clark, D. R., *J. Am. Ceram. Soc.* 82:485 (1999)). The conductivity of the SrTiO$_3$ grain can be improved by doping with donor impurities SrTiO$_3$ followed by sintering the doped SrTiO$_3$ under a reducing atmosphere to make an n-type semiconductor (Gupta. K., *J. Am. Ceram. Soc.* 73:1871 (1990)). When doped SrTiO$_3$ is sintered under a reducing atmosphere, donor impurities such as Niobium (Nb) are present in the grain (Chung, S.-Y. et al., *J. Am. Ceram. Soc.* 85: 2805, (2002)), whereas acceptor impurities such as Aluminum (Al) are present on the grain boundary. Grain boundaries present within the doped SrTiO$_3$ compositions can function as acceptor states within the compositions or as non-conducting materials present at the grain boundary or diffused within the solid (Gupta. K., *J. Am. Ceram. Soc.* 73:1871 (1990)).

A general method for forming an acceptor state on a grain boundary is by applying an oxide such as Lead (PbO), Bismuth (Bi$_2$O$_3$) or Lithium (Li$_2$O$_3$) to the surface of a composition followed by sintering under a mixed atmosphere and heat-treating in air. This process forms a liquid oxide that can infiltrate the grain boundary (see, e.g., Korean Patent Application No. 10-1999-0002445 and U.S. Pat. No. 4,612,160). However, this method is complicated and is difficult to control the diffusion depth of the oxide solute source. Additionally, a diffusion-induced grain boundary migration can be formed during the second heat treatment that results in widening of the grain boundary, and formation of a conductive barrier having a thickness of several microns so that the composition cannot function as a varistor (Jeon, J.-H. and Kang, S.-J. L., *J. Am Ceram. Soc.* 77:1688 (1994)). Other researchers have demonstrated a method whereby the composition is doped with an acceptor impurity followed by sintering under an oxidizing atmosphere to form a grain that operates as an acceptor state, and which results in non-linear current-voltage characteristics (Korean Patent Application No. 10-1999-0057370). However, this process can result in a non-uniform microstructure comprising large grains (>10 microns (μm) in size) that result from abnormal grain growth during the oxidative sintering process. It has been shown that non-linear current-voltage characteristics of the compositions increase as the grain size is decreased (see Gupta. K., *J. Am. Ceram. Soc.* 73:1871 (1990)). Thus, the non-uniformity of the microstructure should be controlled and grain growth should be deterred during the manufacturing process.

The grain conductivity of SrTiO$_3$ varistor compositions can be enhanced by sintering under a mixed atmosphere of 95% N$_2$/5% H$_2$ or in air (Korean Patent Application No. 10-1999-0057370; Kutty, T. R. N. and Philip, S., *Mater. Sci. Eng. B*33:58 (1995); and Kuwabara, M., and Matsuda, H., *J. Mater. Sci.* 34:2653 (1999)). However, these processes can also result in abnormal grain growth within the SrTiO$_3$ (see Chung, S.-Y. et al., *Acta Mater.* 50:3361 (2002). What is needed is a method of sintering SrTiO$_3$ compositions in which abnormal growth of the grains is deterred, in order to obtain a SrTiO$_3$ composition having a uniform microstructure and electrical properties.

BRIEF SUMMARY OF THE INVENTION

The present invention is directed to SrTiO$_3$ series varistors having non-linear current-voltage characteristics having a conductive grain interior and an acceptor impurity segregated on the grain boundaries. The present invention is also directed to methods for forming a doped SrTiO$_3$ composition, wherein acceptor impurities present within the doped SrTiO$_3$ composition aggregate selectively along a grain boundary during sintering under a reducing atmosphere. Aggregation of an acceptor impurity on the grain boundary within the doped SrTiO$_3$ composition results in the formation of an electrical conduction barrier that exhibits non-linear current-voltage characteristics.

The present invention is directed to a method for manufacturing a SrTiO$_3$ series varistor using grain boundary segregation, the method comprising:

(a) doping a powdered SrTiO$_3$ composition with a powdered acceptor impurity to form a doped SrTiO$_3$ composition, (b) sintering the doped SrTiO$_3$ composition in a reducing atmosphere to form a sintered SrTiO$_3$ pellet; and (c) heat-treating the sintered SrTiO$_3$ pellet in an oxidizing atmosphere to form a SrTiO$_3$ series varistor.

The present invention is also directed to a SrTiO$_3$ series varistor formed by the above method.

A SrTiO$_3$ series varistor comprising: a SrTiO$_3$ pellet having a structure comprising:

(a) grains comprising SrTiO$_3$ having grain boundaries therebetween; and (b) an acceptor impurity, wherein the acceptor impurity is localized within about 20 nm of the grain boundaries, and wherein the SrTiO$_3$ pellet exhibits non-linear current-voltage characteristics.

In some embodiments, the doping comprises doping a powdered SrTiO$_3$ composition with a powdered acceptor impurity in a concentration of about 2 mol % or less.

In some embodiments, the doping comprises doping with a powdered acceptor impurity comprising at least one of Al$_2$O$_3$ and Fe(NO$_3$)$_3$.9H$_2$O.

In some embodiments, the sintering comprises sintering the doped SrTiO$_3$ composition in a H$_2$ atmosphere.

In some embodiments, the sintering comprises sintering the doped SrTiO$_3$ composition at a temperature of about 1250° C. to about 1450° C. for a duration of about 10 hours to about 15 hours.

In some embodiments, the heat-treating comprises heat-treating the sintered SrTiO$_3$ pellet in an air atmosphere.

In some embodiments, the heat-treating comprises heat-treating the sintered $SrTiO_3$ pellet at a temperature of about 1000° C. to about 1200° C. for a duration of about 0.5 hours to about 2 hours.

In some embodiments, the method further comprises: compressing the $SrTiO_3$ series varistor.

In some embodiments, the acceptor impurity is present in the $SrTiO_3$ pellet in a concentration of about 2 mol % or less.

In some embodiments, the acceptor impurity comprises at least one of Al ions and Fe ions. In some embodiments, the Al ions are localized within about 10 nm of the grain boundaries. In some embodiments, the Fe ions are localized within about 20 nm of the grain boundaries.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

Figure 1A:
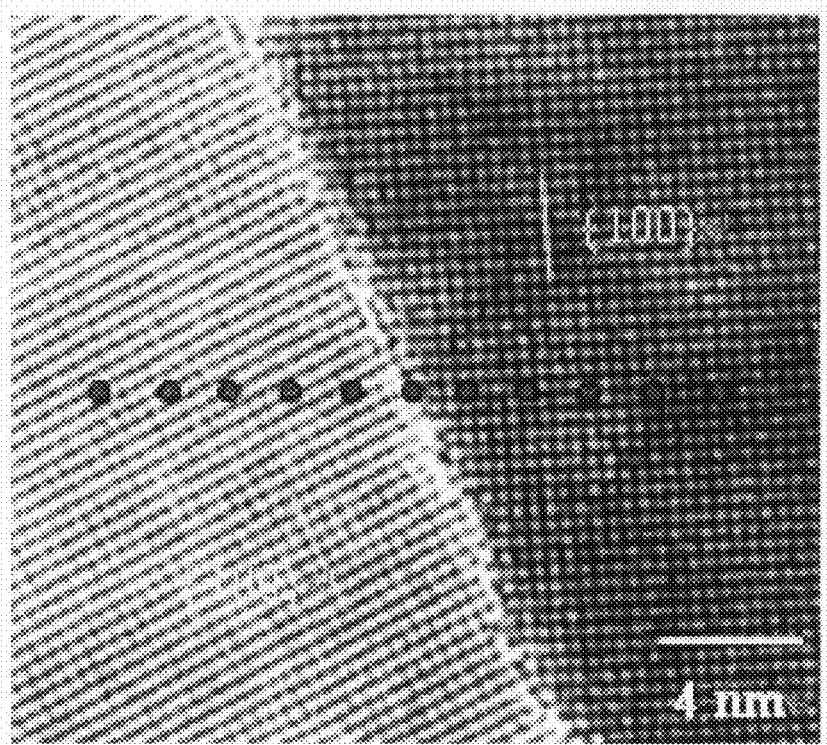
FIG. 1A and FIG. 1B depict a high-resolution transmission electron microscopy picture of the region of a grain boundary of an Al-doped $SrTiO_3$ series varistor of the present invention after sintering in an $H_2$ atmosphere, and a graph showing the composition analysis thereof, respectively.

One or more embodiments of the present invention will now be described with reference to the accompanying drawings. In the drawings, like reference numbers can indicate identical or functionally similar elements. Additionally, the left-most digit(s) of a reference number can identify the drawing in which the reference number first appears.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

In some embodiments, acceptor and donor impurities are added simultaneously to form a doped $SrTiO_3$ composition that is sintered under a reducing atmosphere and heat-treated in an oxidizing atmosphere to selectively from an electrical conduction barrier on the grain boundary and to suppress the abnormal grain growth. In addition, the present invention provides an advantage to obtain a varistor having a breakdown voltage suitable for use depending on the kind and the amount of the added acceptor.

The method for manufacturing a $SrTiO_3$ series varistor using grain boundary segregation according to the present invention is characterized in that $SrTiO_3$ is sintered in a reducing atmosphere and heat-treated in an oxidizing atmosphere by adding the acceptors at the state of raw material powders.

The raw materials suitable for use as dopants include acceptors such as, but not limited to, $Al_2O_3$ and $Fe(NO_3)_3 \cdot 9H_2O$ that are added to the $SrTiO_3$ composition in the form of raw material powders in a concentration of about 2 mol % or less.

In some embodiments, the process of the present invention comprises mixing a $SrTiO_3$ powder having about 0.4 mol % Nb as a donor with $Al_2O_3$ or $Fe(NO_3)_3 \cdot 9H_2O$ powder as an acceptor wherein the Al- or Fe-containing powder is present in a concentration of about 0-2 mol %, and further adding an alcohol solution to form a wet mixture. $ZrO_2$ powder can be additionally added and the wet mixture can be mixed for about 10 to about 24 hours, and then dried (e.g., at about 90° C. to about 110° C. for about 20 to about 30 hours, or at about 100° C. for about 24 hours). After drying, the mixture can be ground, sieve-analyzed and injected into a metal molding, and then compressed under a pressure of about 150 MPa to about 250 MPa, or about 200 MPa using, e.g., a cold isostatic press (CIP).

The compressed powder is then sintered under a reducing atmosphere (e.g., $H_2$) at a temperature of about 1250° C. to about 1450° C., about 1275° C. to about 1425° C., about 1300° C. to about 1400° C., about 1325° C. to about 1375° C., about 1350° C., about 1400° C., or about 1450° C. In some embodiments, the sintering under the reducing atmosphere comprises sintering for a duration of about 10 to about 15 hours, about 11 to about 14 hours, about 12 to about 13 hours, about 12 hours, about 13 hours, about 14 hours, or about 15 hours.

After sintering, the composition is heat-treated in a high-temperature furnace in an oxidizing atmosphere (e.g., air) at a temperature of about 1000° C. to about 1200° C., about 1050° C. to about 1150° C., or about 1100° C. In some embodiments, the heat treatment process is performed for a duration of about 0.5 to about 2 hours, about 1 to about 1.5 hours, about 1.5 hours, or about 2 hours.

The present invention is also directed to a $SrTiO_3$ series varistor manufactured by the above process.

Hereinafter, the present invention will be described in embodiments and experimental examples as below. However, the same sintering and heat-treating process can be adapted in spite of the kinds of additives of donors and acceptors when $SrTiO_3$ series is sintered, and therefore the following examples are set forth to illustrate, but are not to be construed to limit the scope of the present invention.

EXAMPLES

Example 1

Commercially available $SrTiO_3$ powder having an average grain size of 1.5 μm and a purity >99.8% was used in combination with $Nb_2O_5$, $Al_2O_3$ and $Fe(NO_3)_3.9H_2O$ powders having purities of 99.8%, 99.9% and 99.99%, respectively. $SrTiO_3$ powder including 0.4 mol % Nb was mixed with $Al_2O_3$ (1 mol %) powder and placed along with $ZrO_2$ powder in a polyethylene bottle and was then wet-mixed with an alcohol solution for 24 hours. The resulting composition was grinded and sieve-analyzed in an agate mortar and injected in a metal mold to form a circular shape having a diameter of 9 mm and thickness of 5 mm, and then pressed under a pressure of 200 MPa using a cold isostatic press (CIP). The compacted powder was then sintered in a vertical tube furnace under hydrogen ($H_2$) atmosphere at 1350° C. for 12 hours and then heat-treated in air at 1100° C. for one hour. The heat-treatment in air at 1100° C. for one hour selectively oxidizes only the grain boundaries of the doped $SrTiO_3$ composition.

Additional $SrTiO_3$ varistors having Al concentrations of 0.2 and 0.5 mol % were also prepared using this process.

Example 2

$SrTiO_3$ varistors were prepared by the process described in Example 1 except that $Fe(NO_3)_3.9H_2O$ powder was used in place of $Al_2O_3$ powder. $SrTiO_3$ varistors having Fe concentrations of 0.2, 0.5, 1.0 and 2.0 mol %, respectively, were prepared using this process.

Example 3

Figure 1B:
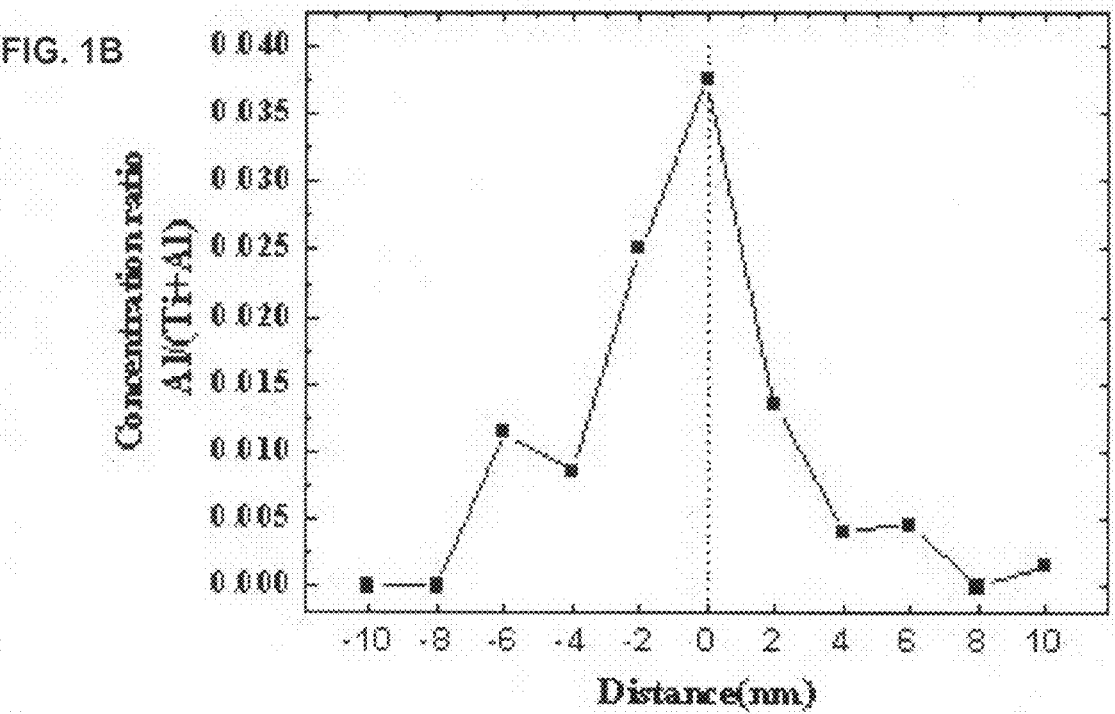

High-resolution microstructures of a grain boundary present after sintering, but prior to heat-treating, of an $SrTiO_3$ varistor containing 1 mol % Al prepared in Example 1 was obtained using field-emission type TECNI (Model F/20, Philips Electronics North America Corporation, New York, N.Y.) with an accelerated voltage of 300 kV, and is depicted graphically in FIG. 1A. The concentration of Al impurities segregated along the grain boundary was measured at an interval of 2 nm using an EDAX® Energy Dispersive X-ray Analysis system (Philips Electronics North America Corporation, New York, N.Y.) having a probe size less than 1 nm. FIG. 1B depicts the Al concentration as a function of distance from the grain boundary.

When $SrTiO_3$ is sintered under a hydrogen atmosphere, the grain has an average grain size of about 2 μm and is entirely uniform. Thus, it is very profitable in view of a reproducibility of a process in comparison with the case that $SrTiO_3$ is sintered in the conventional oxidizing atmosphere to have abnormal grain sizes.

As shown in FIG. 1A and FIG. 1B, Al being an acceptor is strongly segregated on the grain boundary of the Al-doped $SrTiO_3$ sintered under a reducing atmosphere, and is not detected in the region 10 nm away from the grain boundary core.

Example 4

Figure 2A:
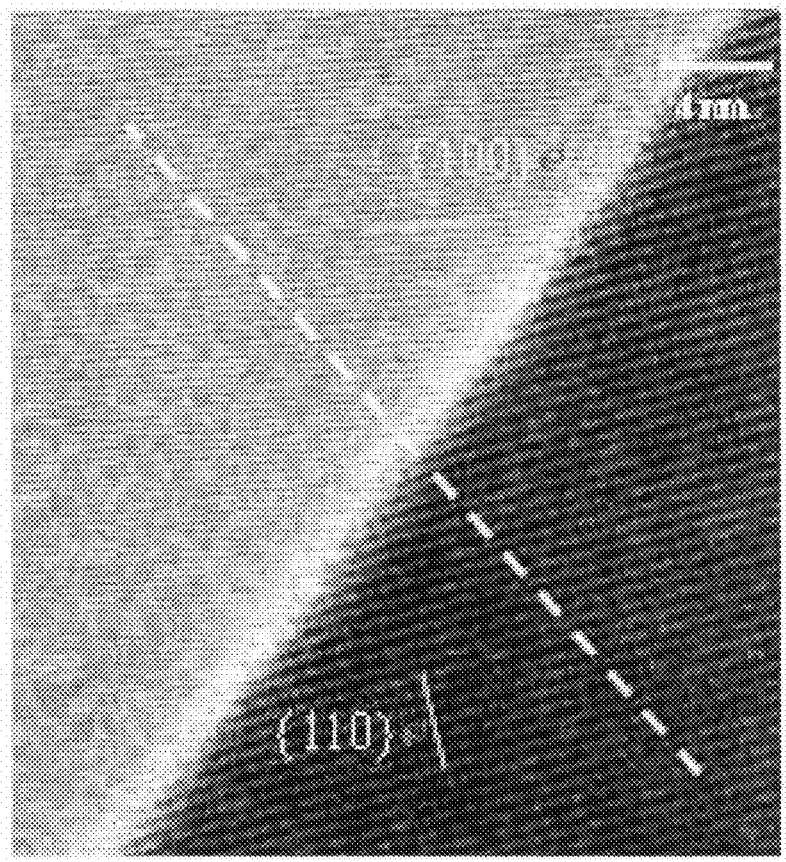
FIG. 2A and FIG. 2B depict a high-resolution transmission electron microscopy picture of the region of a grain boundary of a Fe-containing $SrTiO_3$ series varistor of the present invention after sintering in $H_2$ and heat-treating in air, and a graph showing the composition analysis thereof, respectively.
Figure 2B:
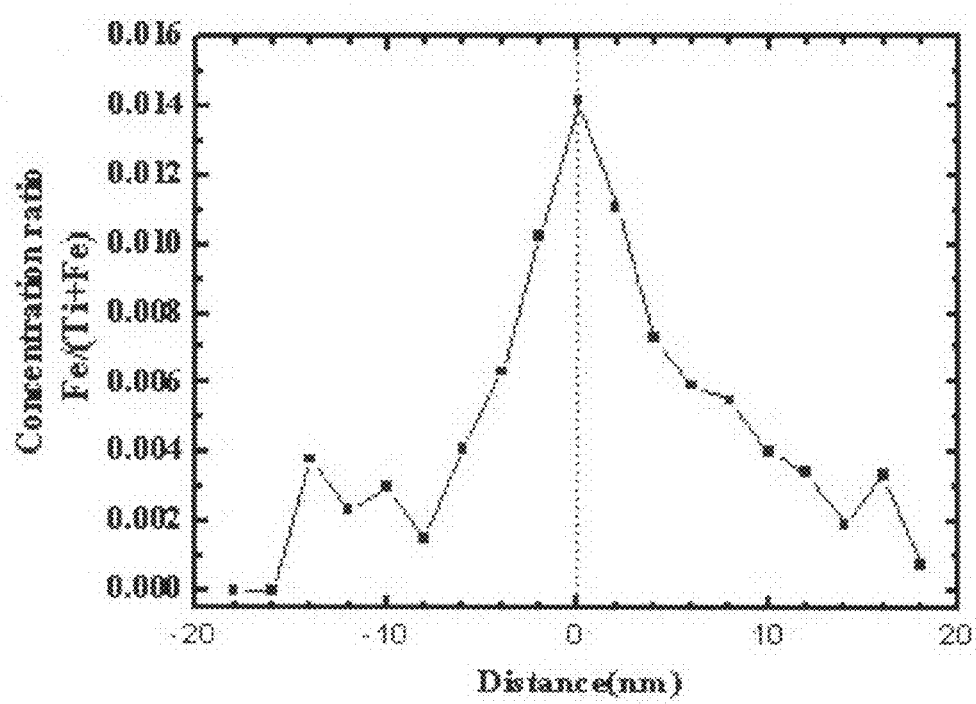

High-resolution microstructures of a grain boundary present after sintering and heat-treating of an $SrTiO_3$ varistor containing 2 mol % Fe prepared in Example 2 was obtained using field-emission type TECNI (Model F/20) with an accelerated voltage of 300 kV, and is depicted graphically in FIG. 2A. The concentration of Fe impurities segregated along the grain boundary was measured at an interval of 2 nm using an EDAX® Energy Dispersive X-ray Analysis system having a probe size less than 1 nm. FIG. 2B depicts the Fe concentration as a function of distance from the grain boundary.

$SrTiO_3$ doped with Fe sintered under a reducing atmosphere and heat-treated in air again is shown in FIG. 2A and FIG. 2B. Fe being the acceptor is observed in the center of a grain boundary but is not detected in the region 20 nm away from the grain boundary core.

Example 5

Figure 3:
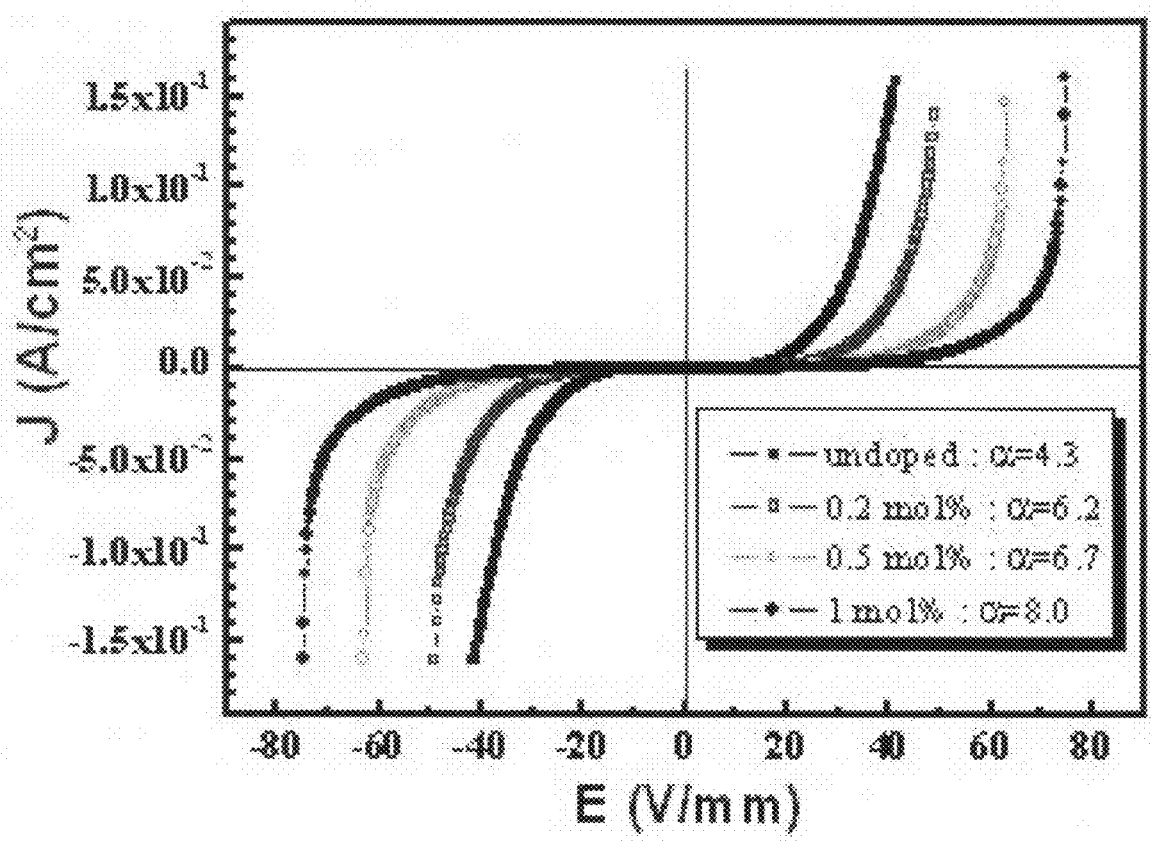
FIG. 3 depicts a graph showing current-voltage characteristics of $SrTiO_3$ series varistors of the present invention doped with varying concentrations of Al.
Figure 4:
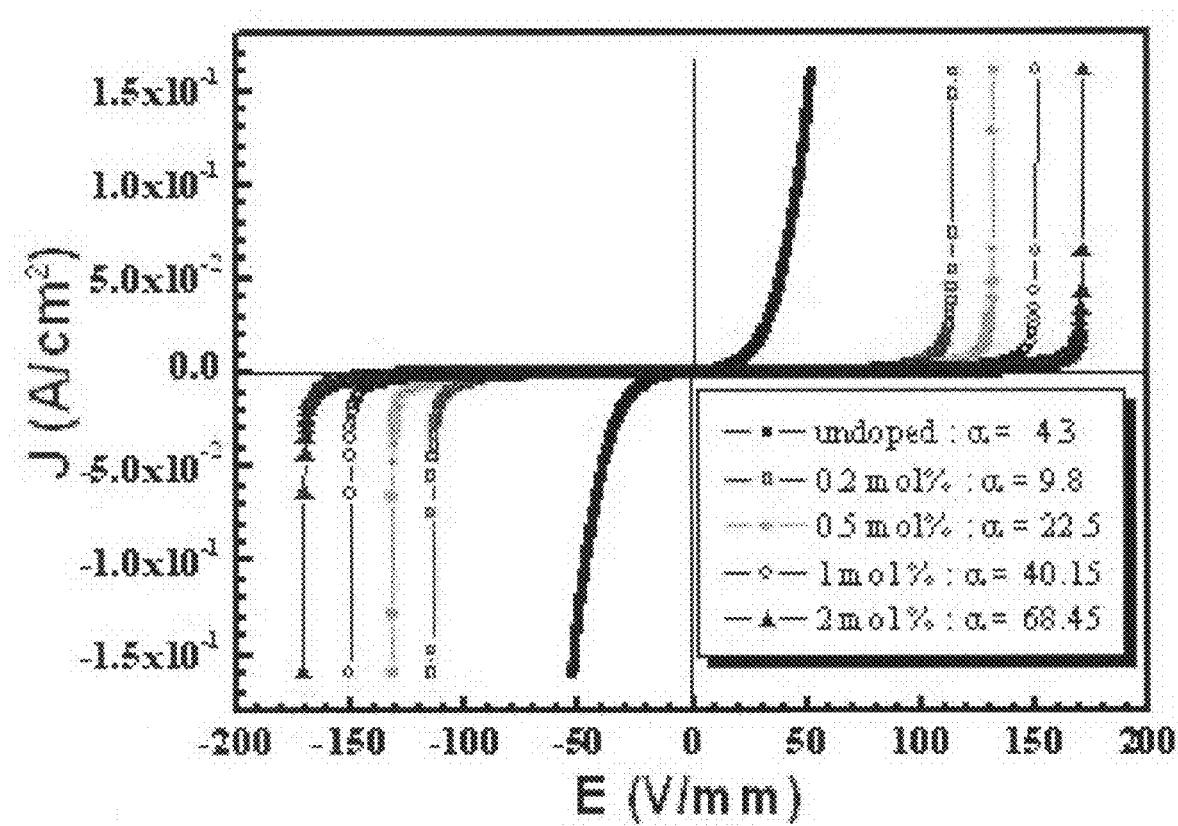
FIG. 4 depicts a graph showing current-voltage characteristics of $SrTiO_3$ series varistors of the present invention doped with varying concentrations of Fe.

The current-voltage characteristics of the $SrTiO_3$ varistors prepared after sintering and heat treating in Examples 1 and 2, respectively, were measured at room temperature using a KEITHLEY® 237A High Voltage Source (Keithley Instruments, Inc., Cleveland, Ohio), and the results are depicted graphically in FIG. 3 and FIG. 4, respectively.

The results in FIG. 3 show that as the concentration of Al is increased, the non-linear coefficient and breakdown voltage also increase gradually. In this case, the breakdown voltage is comparatively small of approximately 20 to 60 V/mm to be applied in a low-voltage varistor.

The current-voltage characteristics of the $SrTiO_3$ varistors containing 0-2 mol % Fe are shown in FIG. 4. It is known that the non-linear coefficient and a breakdown voltage are increased considerably as the amount of added Fe is increased. In addition, in case of an Fe concentration of 2 mol %, the nonlinear coefficient, α, is 68.45 and the breakdown voltage is 170 V/mm. Therefore, this is a varistor material with excellent capabilities.

As shown in the above experimental examples, the method for sintering under a hydrogen reducing atmosphere by adding acceptors at the state of raw material powders when the $SrTiO_3$ series varistor is manufactured is a simple, straightforward process and results in varistor materials having excellent capabilities and reproducibility compared with the infiltration manufacturing method that is currently in use. The electrical conduction barrier can be easily formed to make the grains small and uniform as well as to be suitable for applications. Moreover, as shown in experiments, the additives are controlled in kinds to provide with a $SrTiO_3$ series varistor capable of controlling a breakdown voltage precisely.

CONCLUSION

These examples illustrate possible embodiments of the present invention. While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method for manufacturing a $SrTiO_3$ series varistor using grain boundary segregation, the method comprising:
    (a) doping a powdered $SrTiO_3$ composition with a powdered acceptor impurity to form a doped $SrTiO_3$ composition,
    (b) sintering the doped $SrTiO_3$ composition in a reducing atmosphere to form a sintered $SrTiO_3$ pellet; and
    (c) heat-treating the sintered $SrTiO_3$ pellet in an oxidizing atmosphere to form a $SrTiO_3$ series varistor.

2. The method of claim 1, wherein the doping comprises doping a powdered $SrTiO_3$ composition with a powdered acceptor impurity in a concentration of about 2 mol % or less.

3. The method of claim 1, wherein the doping comprises doping with a powdered acceptor impurity comprising at least one of $Al_2O_3$ and $Fe(NO_3)_3 \cdot 9H_2O$.

4. The method of claim 1, wherein the sintering comprises sintering the doped $SrTiO_3$ composition in a $H_2$ atmosphere.

5. The method of claim 1, wherein the sintering comprises sintering the doped $SrTiO_3$ composition at a temperature of about 1250° C. to about 1450° C. for a duration of about 10 hours to about 15 hours.

6. The method of claim 1, wherein the heat-treating comprises heat-treating the sintered $SrTiO_3$ pellet in an air atmosphere.

7. The method of claim 1, wherein the heat-treating comprises heat-treating the sintered $SrTiO_3$ pellet at a temperature of about 1000° C. to about 1200° C. for a duration of about 0.5 hours to about 2 hours.

8. A $SrTiO_3$ series varistor formed by the method according to claim 1.

9. A $SrTiO_3$ series varistor comprising: a $SrTiO_3$ pellet having a structure comprising:
    (a) grains comprising $SrTiO_3$ having grain boundaries therebetween; and
    (b) an acceptor impurity,
wherein the acceptor impurity is localized within about 20 nm of the grain boundaries, and wherein the $SrTiO_3$ pellet exhibits non-linear current-voltage characteristics.

10. The $SrTiO_3$ series varistor of claim 9, wherein the acceptor impurity is present in the $SrTiO_3$ pellet in a concentration of about 2 mol % or less.

11. The $SrTiO_3$ series varistor of claim 9, wherein the acceptor impurity comprises at least one of Al ions and Fe ions.

12. The $SrTiO_3$ series varistor of claim 11, wherein the Al ions are localized within about 10 nm of the grain boundaries.

13. The $SrTiO_3$ series varistor of claim 11, wherein the Fe ions are localized within about 20 nm of the grain boundaries.

* * * * *